O. M. KIRLIN.
SCALE.
APPLICATION FILED MAR. 11, 1915.
1,184,103. Patented May 23, 1916.
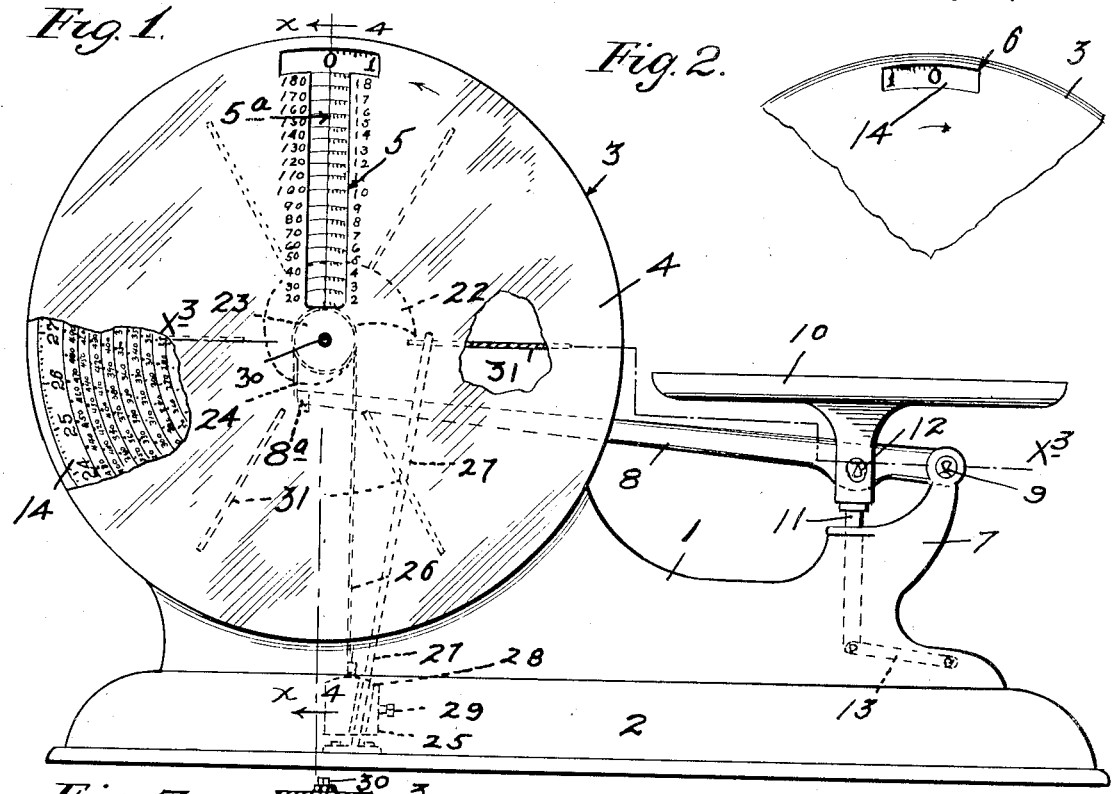
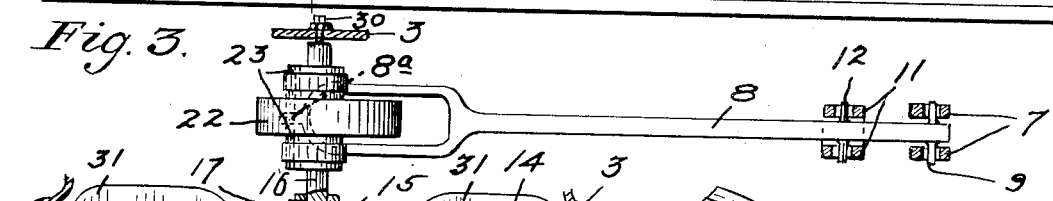
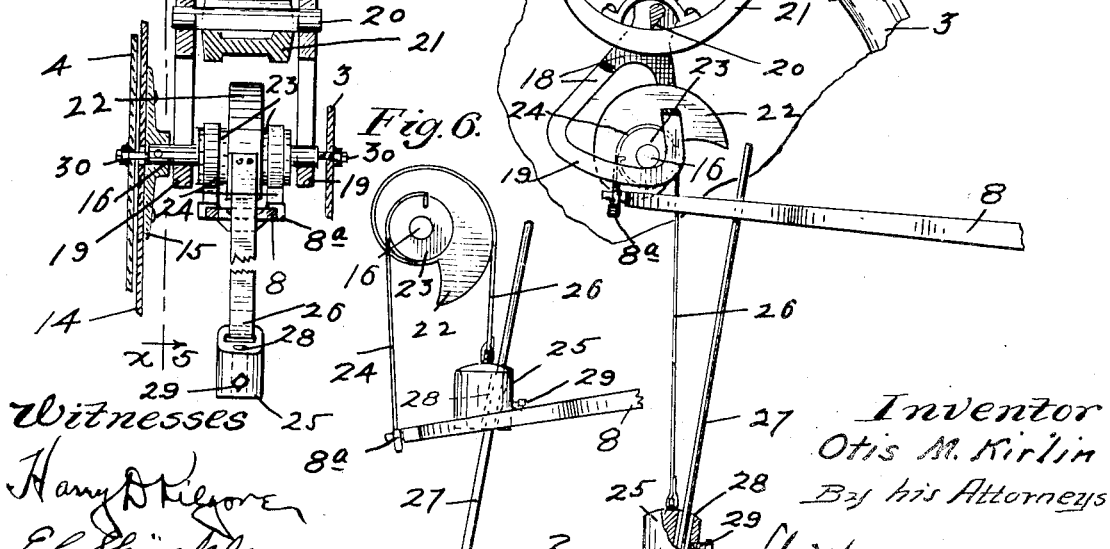
Witnesses
Harry D Kilgore
E. C. Skinkle
Inventor
Otis M. Kirlin
By his Attorneys
Williamson & Merchant

UNITED STATES PATENT OFFICE.

OTIS M. KIRLIN, OF WATERTOWN, SOUTH DAKOTA.

SCALE.

1,184,103.  Specification of Letters Patent.  Patented May 23, 1916.

Application filed March 11, 1915. Serial No. 13,695.

*To all whom it may concern:*

Be it known that I, OTIS M. KIRLIN, a citizen of the United States, residing at Watertown, in the county of Codington and State of South Dakota, have invented certain new and useful Improvements in Scales; and I do hereby declare the following to be a full, clear, and exact description of the invention, such as will enable others skilled in the art to which it appertains to make and use the same.

My invention relates to improvements in scales of the type commonly known to the trade as "computing" or "price" scales. Such scales indicate, not only the weight of the article or commodity being weighed, but its value at a given price per pound (or unit weight) within the capacity of the scale.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:—Figure 1 is a front elevation of the improved scale, some parts being broken away and some of the exposed parts being shown in section; Fig. 2 is a fragmentary view, in rear elevation of the scale casing, in the vicinity of its sight opening; Fig. 3 is a view principally in horizontal section taken on the line $X^3 X^3$ of Fig. 1; Fig. 4 is a view principally in vertical section taken on the line $X^4 X^4$ of Fig. 1; Fig. 5 is a fragmentary view, in front elevation of the scale casing, with its face plate removed, exposing the mechanism contained therein, some parts being broken away and some parts being sectioned on the line $X^5 X^5$ of Fig. 4; and Fig. 6 is a view corresponding to Fig. 5, with the exception that certain parts are shown in different positions and some parts being removed.

The numeral 1 indicates a hollow scale body supported upon a suitable hollow base 2, and, in turn, supporting a vertically extended annular casing 3, with its axis projecting transversely of the scale body. Said scale body 1, base 2, and casing 3 have communication one with the other. The casing 3 is provided with a removable face plate 4, detachably secured in position by means of set screws, or other suitable means, not shown.

Formed in the face plate 4 is a perpendicular slot which affords a sight opening 5 into the interior of the casing 3. This sight opening 5, at its upper extremity is widened to increase the field of said opening. In the back of the casing 3 is a sight opening 6 located circumferentially opposite the widened extremity of the sight opening 5.

Integrally formed with the scale body 1 is a bifurcated bearing bracket 7, between the prongs of which a scale beam 8 is fulcrumed, by knife edge bearings 9, for vertical movement, with its free end working within the casing 3, below the axis of said casing and at right angles thereto.

The scale platform 10 is supported on the scale beam 8, close to its fulcrum 9, by a depending stem 11, which is slotted to receive the scale beam 8 and is pivotally secured thereto by knife edge bearings 12. The slotted engagement of the stem 11 with the scale beam 8 holds said stem against rotary movement on its vertical axis. The lower end of the stem 11 extends through an aperture into the scale body 1 and is pivotally connected thereto by a link 13, with freedom for vertical movement, but against swinging movement longitudinally of the scale beam 8.

An indicator dial 14 extends parallel with the inner surface of the face plate 4 and works close thereto. Secured to the inner face of the dial 14, at the axis thereof, is a hub 15 telescoped onto one end of a horizontally extended shaft 16, axially alined with the axis of the casing 3. A set screw 17 detachably secures the hub 15 to the shaft 16 for common rotation therewith.

A pair of connected laterally spaced rockers 18, having segmental rails 19, are suspended on knife edge bearings 20, from the top of the casing 3, by a bracket 21. To the longitudinal center of the shaft 16, between the rockers 18, is secured a differential lifting lever in the form of an eccentric 22, having an involute curve. Also rigidly secured to the shaft 16, on each side of the eccentric 22, is a drum 23. The free end of the scale beam 8 is bifurcated and the prongs thereof are brought together and connected to the intermediate portion of a short transverse bar 8ª. The drums 23 are connected, one to each end of the bar 8ª, by a cable 24, as shown, in the form of a flat tape of steel or any other suitable material. The shaft 16 is rotated by a pendant weight 25 in a direction to wind the cables 24 on the drums 23, thereby supporting the free end of the scale beam 8 in a raised position. The weight 25 is suspended from the eccentric 22 by a cable 26, of the same type as the cables 24, and is attached to said eccentric at the point of its shortest radius and is adapted to be wound thereon.

As shown, the cables 24 and the cable 26 are arranged to be wound in reverse directions, whereby the power of the weight 25 and the scale beam 8 are opposed to each other and normally counter-poised, with the indicator dial 14 at zero. In the weighing action of the scale, the differential lever 22 is oscillated by the scale beam 8, with a constant leverage, in opposition to the weight 25, thereby causing the load resisting power of the weight 25 to be progressively increased.

To prevent swinging movement of the weight 25, there is provided an oblique guide rod 27, anchored at its lower end to the base 2 and projecting through an oblique aperture 28 in said weight. This aperture is of sufficient size to keep the weight 25 out of contact with the guide rod 27 when the scale is properly positioned. In transporting the scale the weight 25 is rigidly clamped to the rod 27 by a set screw 29. Pivot screws 30, axially alined with the shaft 16 and having screw threaded engagement, one with the back of the casing 3 and the other with the face plate 4, extend into conical seats formed in the ends of the shafts 16, without frictional contact therewith, thereby retain the shaft 16 in proper alinement.

Circumferentially spaced radial blades, or vanes, 31, are secured to the back of the dial 14 for the purpose of steadying the movement of said dial by their contact with the air. The dial 14 and vanes 31 are preferably constructed from aluminum or other light material. The dial 14 is graduated to indicate pounds and fractions thereof, and value amounts. The weight graduations are visible through the expanded portion of the sight opening proper. The sight openings 5 and 6 are covered with transparent panels, of glass or other suitable material, and a hair line 5ª, preferably colored, is drawn through the vertical center of the panel, covering the sight opening 5, and with which the zero point of the dial 14 registers when in a normal position. On the vertical edge portions of the face plate 4, at the sight opening 5, is indicated prices in cents per pound. On the back of the dial 14 is also indicated a duplicate of the weight units shown on the front of the dial, so that a customer may read the weight through the sight opening 6. The weight graduations and computed amounts upon the rotating dial 14 are visible through the sight openings 5 and are to be read on the hair line 5ª, and said computed amounts coincide with the stationary price amounts marked on the face plate 4 on either side of the sight opening 5.

It is, of course, understood that the scale platform, scale beam, and rotating dial may be arranged in various different positions with respect to each other.

The term "cable" is herein used in a broad sense to cover all forms of flexible connections.

What I claim is:

1. In a scale, the combination with a scale beam having a bifurcated end, of a shaft, a weight, an eccentric on said shaft having a cable supporting said weight, an indicator movable with said shaft, a pair of drums on said shaft, and cables connecting the prongs of the bifurcated ends of said scale beam to said drums for oscillating said scale beam and indicator, in opposition to said weight, said cable having a constant leverage action on said drums, whereby the load resisting power of said weight is progressively increased in the weighing action.

2. In a scale, the combination with a scale beam having a bifurcated end, of a shaft, a rocker supported by a knife edge bearing and having a pair of segmental rails on which said shaft is loosely journaled directly below the fulcrum of said rocker, a weight, an eccentric on said shaft having a cable supporting said weight, an indicator movable with said shaft, a pair of drums on said shaft, and cables connecting the prongs of the bifurcated ends of said scale beam to said drums for oscillating said scale beam and indicator, in opposition to said weight, said cables having a constant leverage action on said drums, whereby the load resisting power of said weight is progressively increased in the weighing action.

3. In a scale, the combination with a scale beam, of a weight, a differential lever supporting said weight, an indicator movable with said differential lever, a connection for oscillating said differential lever from said scale beam, in opposition to said weight, said connection having a constant leverage action on said differential lever, whereby the load resisting power of said weight is progressively increased in the weighing action, a guide for preventing swinging movement of said weight, and means for locking said weight to said guide, at will.

4. In a scale, the combination with a scale beam, of a weight, a differential lever supporting said weight, an indicator dial movable with said differential lever and having radial vanes projecting laterally therefrom, and a connection for oscillating said differential lever from said scale beam, in opposition to said weight, said connection having a constant leverage action on said differential lever, whereby the load resisting power of said weight is progressively increased in the weighing action.

In testimony whereof I affix my signature in presence of two witnesses.

OTIS M. KIRLIN.

Witnesses:
R. S. LOCKHART,
PERRY K. LOUCKS.